Nov. 5, 1963  E. FULLER  3,109,241
COMBINED FOLDING RULE AND SQUARE
Filed Sept. 26, 1961  5 Sheets-Sheet 1

INVENTOR.
ERNEST FULLER
BY
*Smirie and Smiley*
ATTORNEYS.

Nov. 5, 1963    E. FULLER    3,109,241
COMBINED FOLDING RULE AND SQUARE
Filed Sept. 26, 1961    5 Sheets-Sheet 2

INVENTOR
ERNEST FULLER

Nov. 5, 1963  E. FULLER  3,109,241
COMBINED FOLDING RULE AND SQUARE
Filed Sept. 26, 1961  5 Sheets-Sheet 3
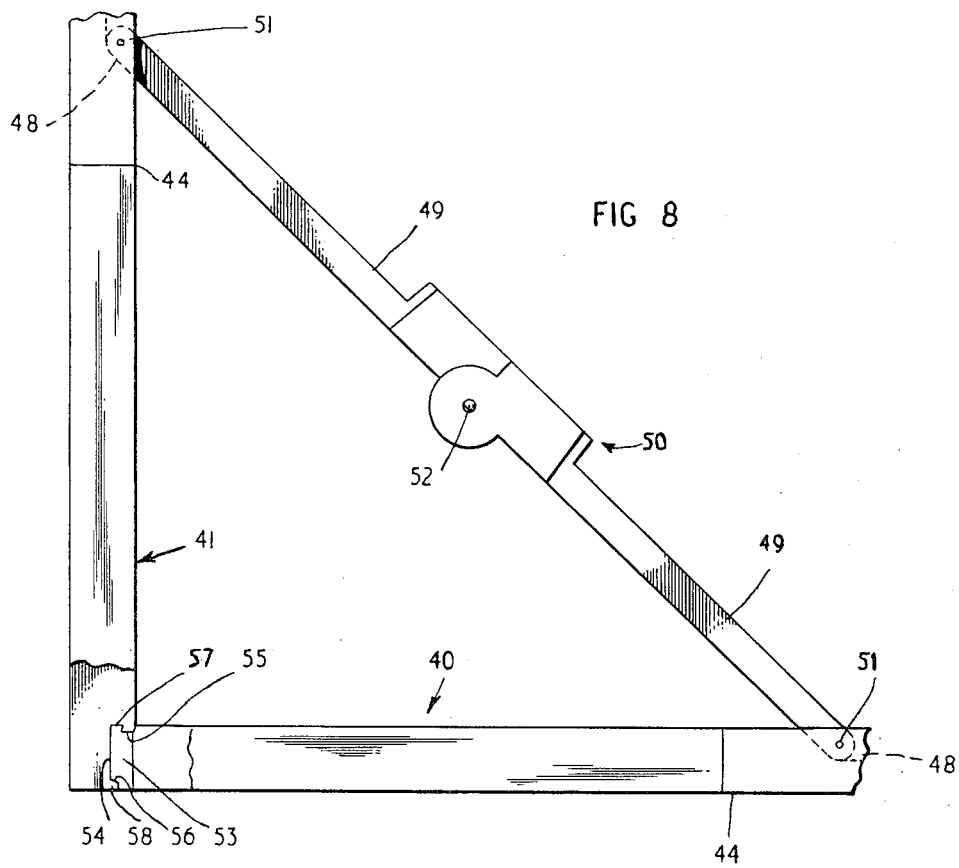
FIG 8
FIG 9
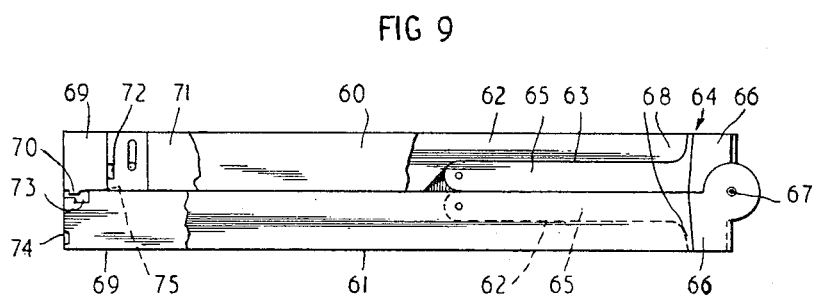
INVENTOR
ERNEST FULLER Nov. 5, 1963     E. FULLER     3,109,241
COMBINED FOLDING RULE AND SQUARE
Filed Sept. 26, 1961     5 Sheets-Sheet 4

INVENTOR
ERNEST FULLER

Nov. 5, 1963

E. FULLER 3,109,241

COMBINED FOLDING RULE AND SQUARE

Filed Sept. 26, 1961

INVENTOR
ERNEST FULLER

United States Patent Office 3,109,241
Patented Nov. 5, 1963

1

3,109,241
COMBINED FOLDING RULE AND SQUARE
Ernest Fuller, 40 Brynheulog St., Port Talbot,
Glamorgan, Wales
Filed Sept. 26, 1961, Ser. No. 140,899
Claims priority, application Great Britain Sept. 26, 1960
8 Claims. (Cl. 33—98)

This invention relates to a combined folding rule and square for use by carpenters and other craftsmen, and has for its object to provide a combination tool which folds to a relatively small and convenient size when not in use, is readily set into the condition for use as a square, and is rigid when in that position.

According to the invention, a combined folding rule and square comprises a pair of connected strip-like members adapted to be brought from a side-by-side position into alignment one with the other for use as a rule and into positions at right-angles to each other to form a square, the said strip-like members being connected one to the other by a knee-jointed strut pivotally attached to them intermediate their ends, the said strut being in alignment with the strip-like members when the said members are themselves brought into alignment with one end of one of them juxtaposed to one end of the other, and extending across the angle between the said members when they are positioned at right-angles to each other with the other end of one of them juxtaposed to the other end of the other, the said other ends of the members being provided with interengageable elements which are locked in engagement, when those ends are brought together, by the straightening of the strut.

The strip-like members are preferably slotted to receive the strut so that the said strut lies within the thickness of the said members.

The invention is hereinafter described with reference to the accompanying drawings, in which:

FIGURE 8 is a plan view of the combined rule and square shown in FIGURE 6 when set up for use as a square;

FIGURE 9 is a plan view of another form of combined rule and square according to the invention in the folded condition;

Figure 11:
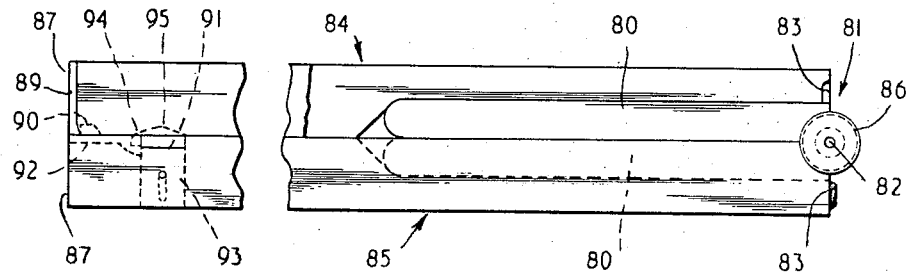
FIGURE 11 is a plan view of another form of combined rule and square according to the invention in the folded condition.

2 rule and square shown in FIGURE 11 when set up for use as a square.

In several of the figures of the drawings, parts have been broken away to provide clearer illustration.

Referring to FIGURES 1 to 5 of the drawings the combined rule and square shown therein comprises two strip-like members 20 and 21 each consisting of two side plates 22 and 23 (FIGURES 4 and 5) held in spaced relation to each other by spacing strips 24 having approximately half the width of the side plates and extending inwardly from one edge thereof so that a groove is formed along the other edge of each strip-like member. The spacing strips 24 extend each from one end 25 of one of the members 20 and 21 to a point a short distance from the other end 26, spacing elements extending from that point to the said other ends of the members 20 and 21 being each built up from three laminations of sheet metal, the laminations in the member 20 being shown at 27, 28 and 29 in FIGURE 4, and the laminations in the member 21 being shown at 30, 31 and 32 in FIGURE 5. The laminations extend right across the members 20 and 21 over part of the length of the latter, and the laminations 27, 28 and 29 in the member 20 extend somewhat beyond the end of the side plates 22, 23 of that member.

Figure 1:
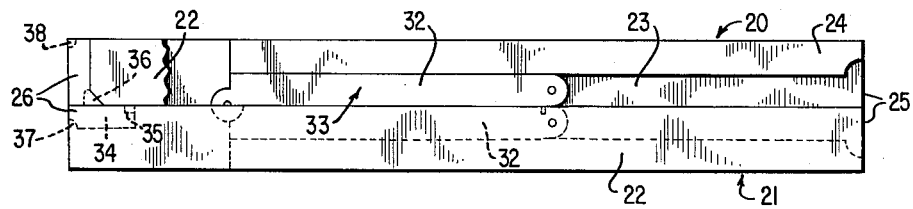
FIGURE 1 is a plan view of one form of combined rule and square according to the invention in the folded condition.
Figure 2:
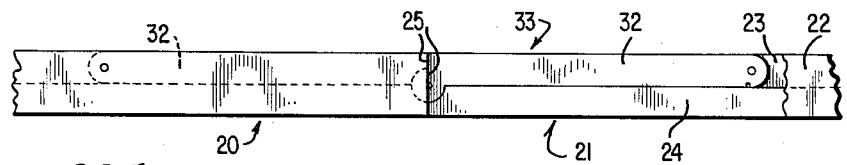
FIGURE 2 is a partial plan view of the combined rule and square shown in FIGURE 1, when extended to serve as a rule.
Figure 4:
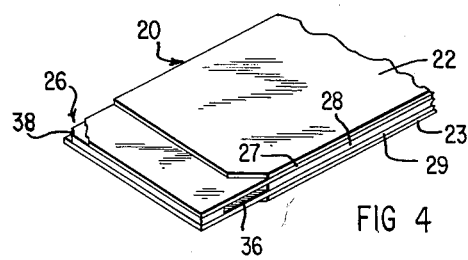
FIGURE 4 is a perspective view of one end of one of the strip like members forming the combined rule and square shown in FIGURE 1.

Each of the members 20 and 21 has pivoted between the side plates 22, 23 thereof one arm 32 of a knee-jointed strut 33, the length of the arms 32 being equal to the distance from their pivots on the members 20, 21 to the ends 25 of the said members. In the folded position of the combined rule and square shown in FIGURE 1, the arms 32 of the strut 33 lie in the slots in the members 20, 21, extending from their pivots towards the ends 26 thereof. To extend the combined rule and square for use as a rule, the members 20 and 21 are brought into alignment with their ends 25 together, as shown in FIGURE 2, the strut 32 being thus extended and each of its arms being turned through 180° relative to the member 20 or 21 on which it is mounted, so that it once again lies in the groove in the corresponding member but extends from its pivot towards the end 26 thereof.

Figure 3:
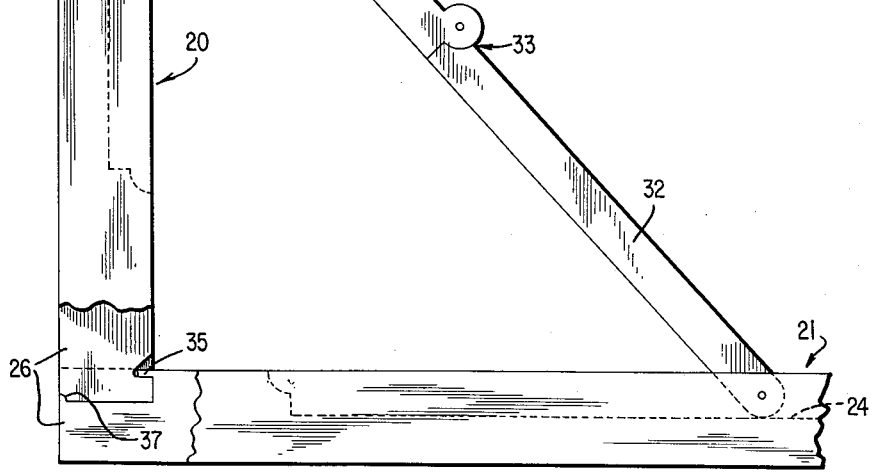
FIGURE 3 is a partial plan view of the combined rule and square shown in FIGURE 1 when set up for use as a square.
Figure 5:
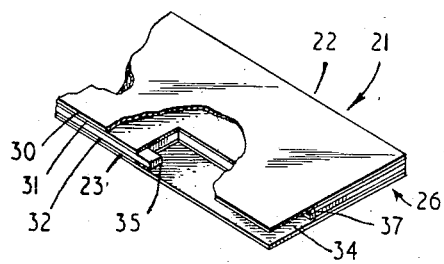
FIGURE 5 is a perspective view of one end of the other strip-like member forming the combined rule and square shown in FIGURE 1.

To extend the combined rule and square for use as a square, the ends 26 of the members 20, 21 are brought together with the strut 32 extended and lying across the angle between them, as shown in FIGURE 3. The laminations 30, 31 and 32 in the member 21 are cut away as shown in FIGURES 1 and 3, to provide a slot 34 which receives the projecting ends of the laminations 27, 28 and 29 on the member 20, a projecting lug 35 on the centre lamination 31 extending a notch 36 in the centre lamination 28, and a projecting lug 37 on the centre lamination 31 entering a notch 38 formed by removing a corner of the centre lamination 28. To engage the lugs in the notches, the ends 26 of the members 20 and 21 are brought together at an acute angle, with the strut 33 partially folded, the ends of the laminations 27, 28 and 29 are introduced into the slot 34 and the lug 35 is inserted in the notch 36. The strut 33 is then straightened, causing the two members to approach a position at right-angles to each other, the lug 37 finally entering the notch 38 when the right-angle position is reached and the strut is straight. The two members 20 and 21 remain locked together so long as the strut 33 is straight, since neither can be pulled away from the other due to the interengagement of the lugs and notches.

Figure 6:
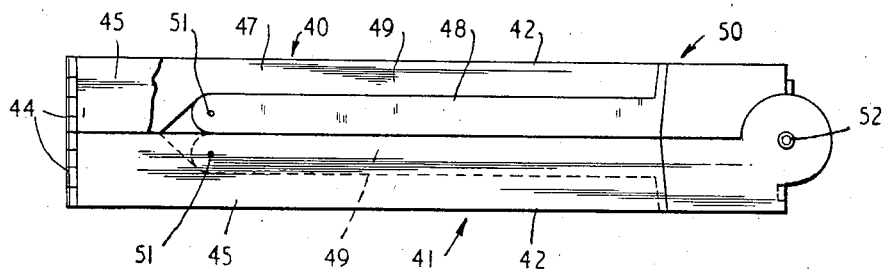
FIGURE 6 is a plan view of another form of combined rule and square according to the invention in the folded condition.
Figure 7:
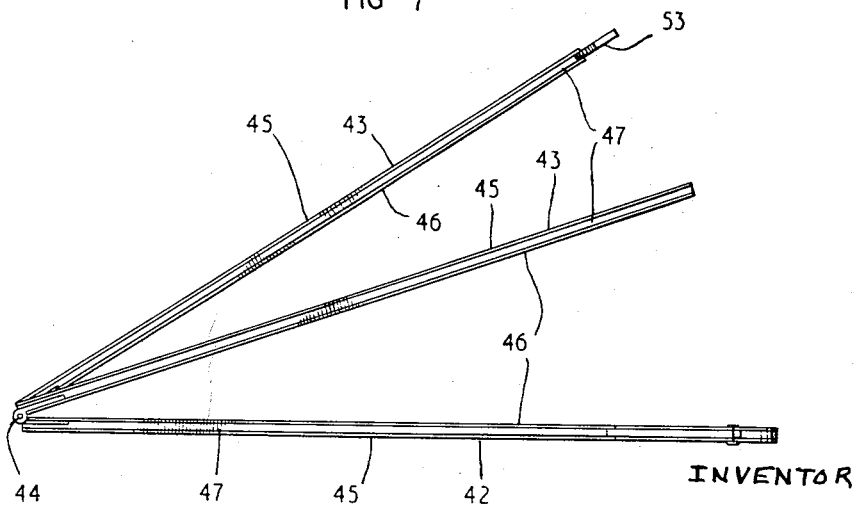
FIGURE 7 is a side view of the combined rule and square shown in FIGURE 6, partially unfolded.

Referring to FIGURES 6, 7 and 8 of the drawings the combined rule and square shown in those figures is of the four-fold type, each of the two strip-like members 40 and 41 comprising two parts 42 and 43 connected one to the other by a hinge 44 so that the said parts can fold flat against each other. Each part 42 and 43 of both members 40 and 41 comprises two side plates 45 and 46 spaced apart by a spacing strip 47, the spacing strips of the parts 42 being cut away, as shown in FIGURE 6, to provide slots 48 betwen the side plates. The arms 49 of a knee-jointed strut 50 are pivoted in the slots 48 at 51, the parts of the arms 49 adjacent the pivot 52 of the strut being wider than the remainder of the arms so as to provide, when the said arms are aligned with the parts 42, extensions of the said parts.

For use as a rule, the two parts 42 and 43 of each member 40 and 41 are unfolded, and the two members 40 and 41 are moved relative one to the other about the strut pivot 52 into alignment with each other.

For use as a square the parts 42 of the two members 40 and 41 are moved away from each other, causing the strut arms 49 to turn about their pivots at 51 and approach a position of alignment, the remote ends of the parts 43 being brought together and interlocked by the final straightening of the strut.

The interlocking of the two parts 43 is effected by a projecting end portion 53 of the spacing strip 47 in the part 43 of the member 41 being inserted in a slot 54 formed by cutting away a portion of the spacing strip in the other part 43, the projecting end portion 53 being formed with notches 55 and 56 to receive lugs 57 and 58 formed on the spacing strip 47 of the said other part 43, the notches and lugs being clearly shown in FIGURE 8, which shows the combined rule and square set up for use as a square. It will be appreciated that, in this position, the strut holds the parts 42 and 43 of each member 40 and 41 in alignment with each other.

Figure 10:
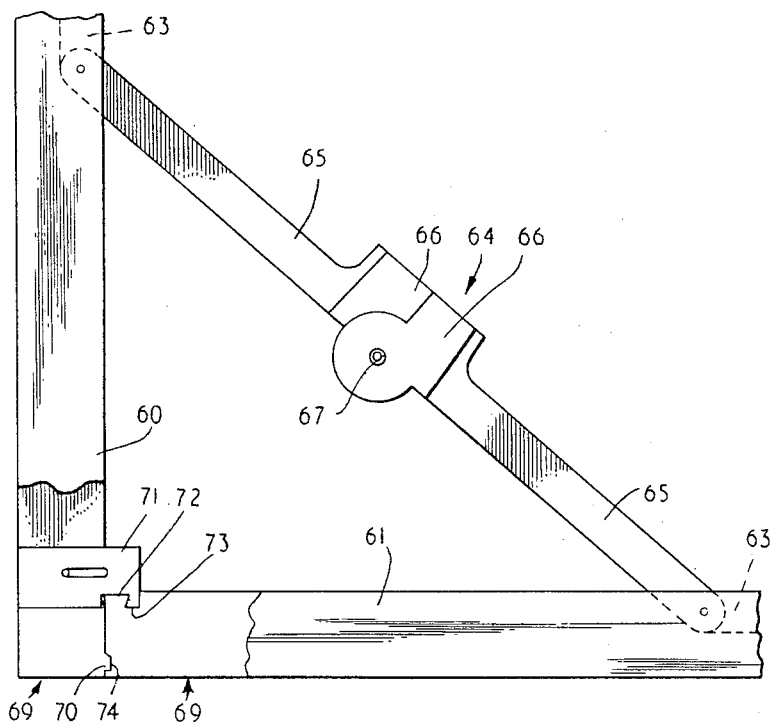
FIGURE 10 is a plan view of the combined rule and square shown in FIGURE 9, when set up for use as a square.

The combined rule and square shown in FIGURES 9 and 10 of the drawings is of the two-fold type, each of the two strip-like members 60 and 61 comprising two side plates separated by a spacing strip 62 shaped to provide a slot 63 between the side plates the two members 60 and 61 are connected one to the other by a knee-jointed strut 64 the arms 65 of which have portions 66 adjacent the pivot 67 of the strut forming, when the said strut portions are in the slots 63 and in alignment with the members 60 and 61, extensions of the said members at their ends 68. The members 60 and 61 can thus be brought into alignment for use as a rule by turning one relative to the other about the pivot 67, keeping the arms 65 of the strut in alignment with the respective members 60 and 61.

At their opposite ends 69, the members 60 and 61 are provided with interlocking elements, the member 60 having a lateral lug 70 on its spacing strip 62, and having the said spacing strip cut away to provide a transverse slot in which is slidable a tongue 71 having a notch 72 in one side. The spacing strip 62 of the member 61 is cut away to provide a side notch 73 and an end notch 74, the combined rule and square being set up for use as a square by bringing the ends 69 of the members 60 and 61 together at an acute angle after pushing the tongue 71 outwardly to the position shown in FIGURE 10, inserting the projecting end of the tongue into the side notch 73, and then straightening the strut so that the side edge of the member 60 swings into engagement with the end edge of the member 61, and the lug 70 enters the notch 74, thus locking the two members together. The edges of the side plates of the member 60 are cut away at 75, to enable the tongue 71 to be inserted in the side notch 73.

Figure 12:
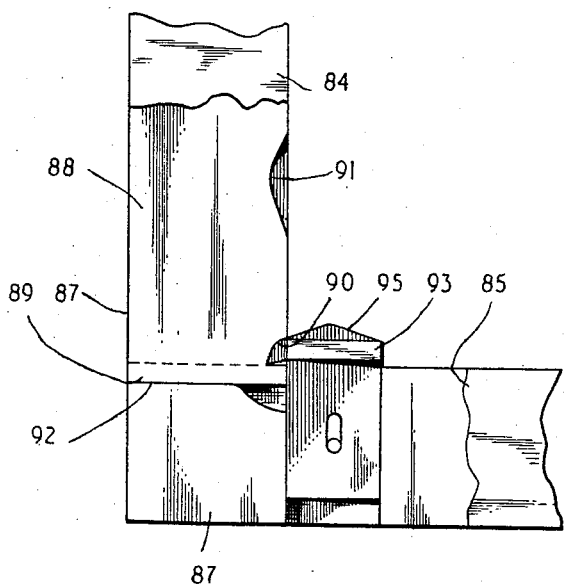
FIGURE 12 is a partial plan view of the combined

The combined rule and square shown in FIGURES 11 and 12 is in many respects closely similar to that described with reference to FIGURES 9 and 10, but the arms 80 of the knee-jointed strut 81 are of uniform width throughout their length, the centre of the pivot 82 between the said arms lying on the line of the ends 83 of the strip-like members 84, 85 when the said combined rule and square is folded, as shown in FIGURE 1. Discs 86 mounted on the pin of the pivot 82 overlap the side plates of the strip-like members 84, 85. The ends 87 of the members 84, 85 are provided with interlocking elements to hold those ends in engagement at right-angles to each other, the spacing strip 87 of the member 84 projecting beyond the side plates of that member at 89 and having notches 90 and 91 in its side. The notch 90 is undercut at its end adjacent the end 87 of the member.

The spacing strip 88 of the member 85 is cut away at one side to provide a recess 92 to receive the projection 89, and a tongue 93 is slideable in a transverse slot in the member 85, the tongue 93 being formed with a side lug 94 to enter the notch 90 when the tongue is projected. The lug 94 is undercut to engage with the undercut end of the notch 90.

The combined rule and square is set up for use as a square in the same manner as that shown in FIGURES 9 and 10. When the tongue 93 is retracted, and end portion 95 thereof remains projecting from the side of the member 85, and enters the notch 91 in the member 84 when the combined rule and square is folded.

No markings are shown on the strip-like members in the drawings, but it will be understood that they are marked with linear units such as inches or centimeters and also with suitable scales for the laying out or measuring of angles. The linear units may be marked on one side of the strip-like members and the angle-measuring scales on the other side. To facilitate the setting out of roof timbers for a roof of a given span and pitch, the strip-like members may have linear markings on the edge of one side which is outermost when the said members are at right angles, and markings showing degrees of arc on the opposite edge of that side, the degree markings being opposite to linear markings showing the vertical distance from the eaves to the ridge of the roof in proportion to half the span. For example, if half the span is taken to be 12 units, the 45° marking is placed opposite the 12 unit marking on the linear scale and each of the remaining degree markings is opposite to a linear marking showing the number of units in the height of a roof having a span of 12 units and a pitch angle of the number of degrees indicated by that degree marking. Thus the roof height can be read off without the use of tables or the need for calculation.

I claim:

1. A combined folding rule and square comprising a pair of connected strip-like members adapted to be brought from a side-by-side position into alignment one with the other for use as a rule and into positions at right-angles to each other to form a square, the said strip-like members being connected one to the other by a knee-jointed strut pivotally attached to them intermediate their ends, the said strut being in alignment with the strip-like members when the said members are themselves brought into alignment with one end of one of them in proximity to one end of the other, and extending across the angle between the said members when they are positioned at right-angles to each other with the other end of one of them juxtaposed to the other end of the other, the said other ends of the members being provided with interengageable elements which are locked in engagement, when those ends are brought together, by the straightening of the strut.

2. A combined folding rule and square according to claim 1, wherein the strip-like members are slotted to receive the strut so that the said strut lies within the thickness of the said members.

3. A combined folding rule and square according to claim 1, wherein the interengageable elements comprise a tongue on one of the strip-like members adapted to enter a slot in the other of said members, and co-operating projections and recesses associated with the tongue and slot, the projections and recesses being so arranged that they are interengaged by inserting the tongue in the slot with the said other ends of the said members at an acute angle to each other and moving the said members relatively until they assume a position at right-angles, the said elements then holding the members against separation.

4. A combined folding rule and square according to claim 3, wherein the tongue is slidably mounted in one of the strip-like members between a retracted and an operative position.

5. A combined folding rule and square according to claim 1, wherein each of the strip-like members is foldable about a hinge axis intermediate its ends in a direction at right-angles to its pivoted connection to the strut, the hinge axes being between the pivotal connections of the said strip-like members to the strut and the said other ends of said members.

6. A combined folding rule and square according to claim 1 wherein the strip-like members are formed by strips laminated to each other.

7. A combined folding rule and square comprising a pair of strip-like members adapted to be brought from a side-by-side position into alignment one with the other for use as a rule and into positions at right-angles to each other to form a square, a strut having two parts and a knee joint and forming the sole connection of one member to the other in the folded condition of the rule, said parts being hinged together at said knee joint and pivotally attached at their ends opposite the knee joint to the said strip-like members at points intermediate their ends, said knee joint of the strut in the folded condition of the rule being positioned near one end of each of the strip-like members, the strip-like members being pivotable about said knee joint of the strut to bring the members into alignment for use as a rule with the strut parts also in alignment with said members, the said strut being unfoldable at its joint to pivotally move said members about the pivots at the ends of the strut parts opposite the strut joint to positions at right-angles to each other with the other end of one member juxtaposed to the other end of the other member and with the unfolded strut parts extending in a straight line across the angle between the said members, and the said other ends of the members having interengageable elements which lock the members to form said square when said other ends are brought together by the straightening of the strut.

8. A combined folding rule and square according to claim 7 wherein each of the strip-like members is foldable about a hinge axis intermediate its ends in a direction at right-angles to its pivoted connection to the strut.

References Cited in the file of this patent
UNITED STATES PATENTS

| | | |
|---|---|---|
| 451,810 | Cowgill | May 5, 1891 |
| 778,659 | Guth | Dec. 27, 1904 |
| 818,401 | Wycoff | Apr. 17, 1906 |
| 1,106,232 | McFarland | Aug. 4, 1914 |
| 1,674,882 | Bloomfield | June 26, 1928 |